United States Patent [19]

Worn et al.

[11] 4,310,314

[45] Jan. 12, 1982

[54] REFLECTED COLOR SIMULATOR

[75] Inventors: Philip R. Worn, Belle Mead; Ralph A. Stanziola, Bridgewater, both of N.J.; Donald R. Hall, South Yarmouth, Mass.

[73] Assignee: Applied Color Systems, Inc., Princeton, N.J.

[21] Appl. No.: 162,338

[22] Filed: Jun. 23, 1980

[51] Int. Cl.$^3$ .............................................. G09B 19/00
[52] U.S. Cl. ................................................... 434/101
[58] Field of Search ................. 434/98, 100, 101, 102, 434/103, 104

[56] References Cited

U.S. PATENT DOCUMENTS

| | | | |
|---|---|---|---|
| 2,522,723 | 9/1950 | Rookyard | 434/102 |
| 2,606,373 | 8/1952 | Lamberger | 434/101 |
| 3,101,558 | 8/1963 | Young | 434/101 |
| 3,231,990 | 2/1966 | Mosbacher | 434/101 |
| 4,048,493 | 9/1977 | Lee | 434/98 X |

Primary Examiner—Harland S. Skogquist
Attorney, Agent, or Firm—John J. Kane; Frederick A. Zoda; Albert Sperry

[57] ABSTRACT

A reflected color simulator is disclosed which utilizes a plurality of color discs positioned adjacent to one another wherein each disc includes several individual sections which are interleaved with respect to the other color discs such that rotational movement of the discs with respect to one another will vary the percentage of color from each disc which contributes to the color displayed when the discs are spun together. The entire group of discs, which could be of any number but preferably 6 or 7, are rotated by a main drive device to mix the colors so exposed to form the desired color by reflected simulation. An observer when viewing the spinning group of color discs will see a reflected color which is determined by the exposed percentages of each color disc. Each of the color discs preferably is of a different color and individual control of rotation of each disc is achieved in a remote fashion in order to allow independent rotation of the discs even during simultaneous rotation of all the discs to simulate the reflected colors. This remote control is achieved by including a plurality of drums oriented concentrically about the main drive shaft wherein each drum is fixedly secured at the forward end to one of the color discs such that rotation of one of the drums causes a relative rotation of one of the color discs with respect to the others.

20 Claims, 4 Drawing Figures

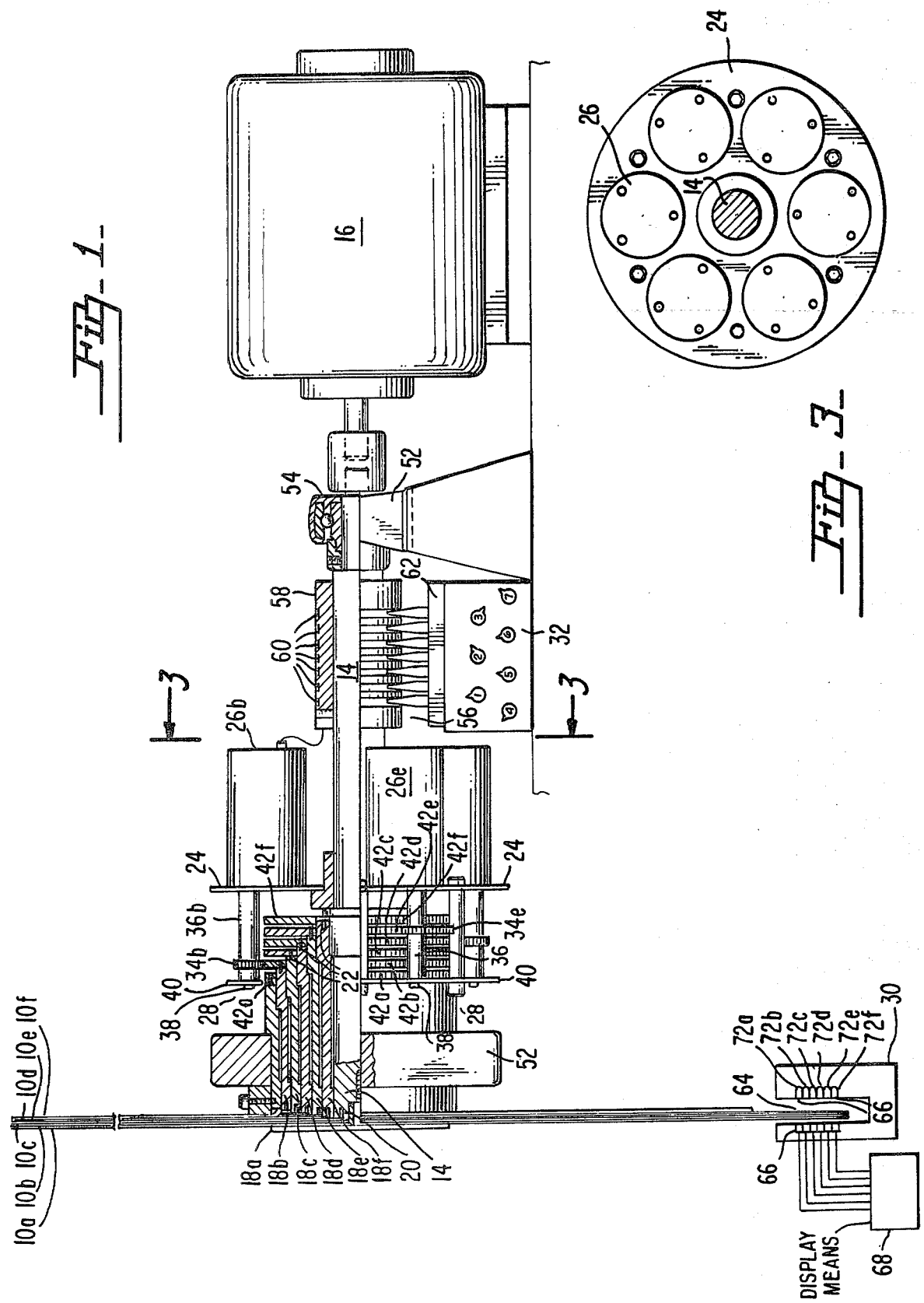

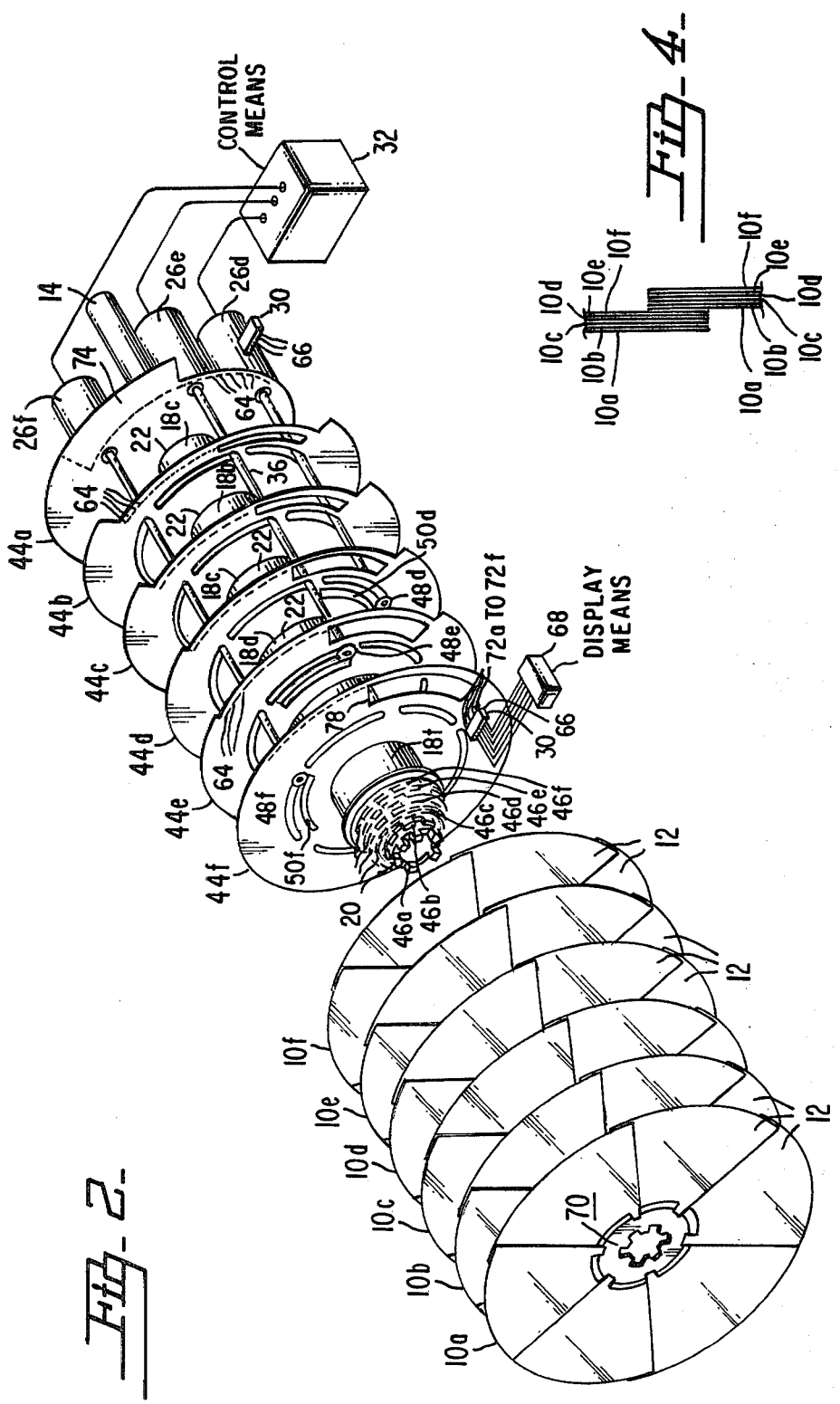

REFLECTED COLOR SIMULATOR

BACKGROUND OF THE INVENTION

1. Field of the Invention

The present invention relates to the field of color simulation devices and in particular such color simulation devices utilizing reflected color for the given simulation by the rapid rotation of a color wheel which includes sectors of different colors. This wheel may be viewed by an observer in variable light conditions such as tungsten, fluorescent or day light. Such devices are particularly useful for any type of color matching application particularly for quality control of fabrics, dyes and the like. Devices of this nature have a wide variety of applications such as color communication, color specification, color difference evaluation, color simulation under different lights, color formulation in combination with a computer, color creation, color quality control and production control.

The reflected color simulator of the present invention is specifically usable in a variety of means and is particularly usable for quickly and easily creating a visual reflectance color, including or excluding gloss effects as desired under various controlled illuminants of different color temperatures. It is also particularly usable to quantify and communicate color as well as to exchange color specifications and thus provide decorators and color technologists with means for specifying and visualizing colors. The color values then can be communicated in many different ways, including tele-communication.

This reflected color simulator is also particularly useful to establish quantified visual color differences and tolerances as well as to visualize desired variations about an existing or created color standard. Also the device is found to be particularly useful to retrieve a stored visual color standard from a file of many million colors. When used with a microprocessor color values from various color order systems or color scales can be entered and converted into the equivalent visual color. When interfaced with a computerized system this reflected color simulator can be used with specific software to formulate a color to a visually "created" color where no standard exists. With a similar system this color simulator can be used to match a metameric standard and has the capability to illustrate less resultant metamerism than with other types of simulating systems.

When used with a minicomputer system this simulator can obtain a final color correction to attain a satisfactory production match. The simulator can also be interfaced to a paint dispensing means to produce a complete color match from initial color selection to an actual paint sample or batch in a minimal amount of time. When using appropriate color discs this simulator can show metallic, pearlescent or fluorescent colors. When further appropriate color discs are used this simulator can show graphic arts colors and from this there can be calculated optimum blended ink formulas.

2. Description of the Prior Art

Many prior art devices have been designed in order to simulate colors by reflection. Heretofore such devices were limited in application. Most of the successful devices utilize a rapidly rotating and variable color wheel, however, with most such devices it was necessary to stop the wheel in order to vary the color thereof and then initiate rotation thereof again. In those devices which did allow color adjustment during wheel rotation, the mechanism and methods of adjustment proved to be awkward and cumbersome. The present invention provides an efficient operating device which allows continuous variation of the color while maintaining the mixing speed of rotation of the color wheel. Also the present invention allows easy replacement of the chosen color wheels to vary the gamut of possible colors and visual effects.

Some attempts at this type of design have been made heretofore, however, such designs utilized often complicated and intricate mechanical intergearing which proved to be less than suitable for everyday use due to the excessive maintenance requirements. Also such devices produce excessive and unacceptable tolerance levels due to the lag introduced by numerous gear to gear contacts required with such mechanical configurations. The present invention provides an electrical means for continuously controlling the intermixing of interleaved color discs wherein near zero tolerancing is achieved as to the read-out of the disc positions, without the usual requirement of precision tolerancing of the mechanical components. This success is achieved by the combination of a mechanical design which provides a directly plurality of concentric drums each including an individual drive means, which is simultaneously rotatable with the color wheel itself; plus an integral encoding means which reads the direct position of each disc segment from the exposed orifices located in the periphery of the respective disc segments.

SUMMARY OF THE INVENTION

The present invention provides a color simulator which generates reflected color from a rapidly rotating plurality of color discs which are positioned adjacent to one another. Any number of discs may be used but 6 or 7 is preferable. Each color disc includes a plurality of individual sections which are interleaved with respect to similar sections of adjacent color discs in such a fashion that a percentage of the color from each individual disc is included in the overall color exposure which additively creates the reflected color simulation. By having interleaved sections each individual color disc which preferably is each of a different color can be rotated with respect to one another to vary the proportion of each disc utilized for the particular color simulation. Alternatively, one or more of the discs could introduce a visual effect other than merely a change in coloration, such as gloss, texture, luminescence, fluorescence or pearlescence.

The grouping of color discs is also mounted for rotational movement as a unit in order to thoroughly mix the actual colors exposed by the group of discs. The final color achieved by mixing and rapid rotation of the discs can be varied by a slight change in the rotational orientation of any of the color discs with respect to any of the other color discs.

In order to provide rotational movement to the entire grouping of color discs a main shaft means is preferably included which is attached with respect to the discs. This main shaft means will preferably be connected to a main drive means to selectively cause rotational movement thereof with the consequential rotational movement of the color discs as a unit.

Each of the individual color discs is fixedly secured with respect to a drum means and as such a plurality of drum means must be provided equal to the number of movable color discs. The plurality of drum means are oriented concentrically with respect to one another around the main shaft such that each of the drum means is individually rotatably movable selectively with respect to one another and with respect to the main shaft. However, the plurality of drum means and the main shaft are also movable as a unit upon actuation of the main drive means and consequential rotation of the main shaft means. Each of the drum means is associated with and secured preferably at the forward end thereof to a different one of the color discs such that rotation of the drum means will cause a similar rotational movement of the color discs and specifically rotation of one of the drum means with respect to the other drum means will cause a similar rotation of one of the color discs with respect to the other color discs in such a fashion as to vary the amount of color exposed from the color discs for the reflected color simulation.

A mounting plate is preferably secured with respect to the main shaft such as to be rotatable therewith. This mounting plate provides the means of securement of a plurality of secondary drive means such that these secondary drive means are also rotatably movable responsive to rotation of the main shaft means. Each of the secondary drive means is operatively connected by a gearing means to one of the drum means and consequentially is also connected with respect to one of the color discs. In this manner actuation of one of the secondary drive means will cause movement of the drum means with respect to the other drum means and a resulting rotational movement of the color disc with respect to the other color discs to thereby vary the exposed color proportions. The gearing between the secondary drive means and the individual associated drum will also serve to hold the drums fixed with respect to one another when the main shaft is rotated and when none of the secondary drive means themselves is being activated.

The gearing means may take a variety of forms but in one preferred embodiment a plurality of gearing means are provided equal in number to the number of drums and the number of secondary drive means. With this configuration the output shaft of each secondary drive means may have a secondary drive gear positioned therearound. Also the outermost end of the output shaft may be fixedly secured within an aperture defined by a bearing plate to provide overall stability for the output shaft end of one of said drum means. In this manner the overall configuration will be such that each secondary drive means is operatively connected to the associated drum means by way of a gearing means which includes a secondary drive gear attached to the output of the associated secondary drive means which is in mesh with a drum gear means which is fixedly secured to the associated drum means. In this manner the drum gear means and its associated secondary drive gear means will be operable to selectively cause bi-directional rotation of the drum means and its associated color disc with respect to the other of said drum means and the other associated color discs responsive to actuation of the respectively associated secondary drive means.

In an alternative configuration the gearing means may take the form of an index gear which is operably secured with respect to the output shaft of the secondary drive means. With this configuration each drum means will include an index plate fixedly secured thereto. Also a plate gear will be fixedly secured with respect to each index plate in a position such that the index gear of the secondary drive means output shaft will be in engagement therewith. With this configuration actuation of a secondary drive gear means will cause rotation of the index gear on the output shaft thereof resulting in gear action with respect to the plate gear of the associated index plate which will cause the index plate to rotate causing the drum means to rotate with respect to the other drums and resulting in a rotation of the associated color discs with respect to the other color discs.

It will preferably be desirable to retain the main shaft and the drum means associated therewith by placement within a support means and preferably two support means to maintain the predetermined orientation of the main shaft means as well as the other rotating parts secured with respect thereto. These rotating parts will include the grouping of color discs, the main shaft means, the plurality of drum means, the plurality of gearing means as well as the mounting plate as well as each of the secondary drive means. With these secondary drive means so rotating it will be necessary to provide a rotational contact means for operably connecting an overall control means with respect to each of the secondary drive means to thereby allow continual adjustment of the position of the sections of the color discs relative to one another even during rotation of the color discs as a unit by rotation of the main shaft means.

This rotational contact means will preferably include a slip ring cylinder which is fixedly secured with respect to the main shaft to be rotatable therewith. This slip ring cylinder will preferably include a plurality of circumferential contact means each being connected in electrical contact with respect to one of the secondary drive means. In order to maintain contact between the non-rotating control means and the rotating slip ring cylinder a plurality of brush means must be included in electrical communication with respect to the control means wherein each of the brush means is also in continuous electrical communication with respect to one of the circumferential contact means. In this manner the control means will be able to continuously provide an individual electrical communication from the control means through the brush means to the secondary drive means associated therewith and in that manner provides an operating means that permits a bi-rotational control that is effective to rotate individual discs or combinations of discs in respect to other discs or combinations thereof.

It is also preferable to include a sensor means which is adapted to provide a continual readout through preferably a display means of the actual proportion of each color disc which is exposed to simulate color. This sensor means may take the form of a photoelectric cell means. In one preferred form of the embodiment a plurality of orifices may be included circumferentially about the individual color discs in such a fashion as to indicate to the photoelectric means the proportion of each disc being utilized to form the total composite color simulation. The means for signaling the photoelectric cell means could also be a reflecting encoder strip or similar means. In another embodiment, the holes will not actually be held in the color wheel themselves, nor in the outer periphery thereof, but will be located in the outermost circumference of the index plates. Since there is one index plate associated with each color disc, a direct reading by the sensor means on the index plate can be directly converted into a proportional reading for the individual color discs. Therefore, it is an equivalent configuration and similarly operable to provide the orifices in the outermost circumference of the color discs to be read by the sensor means as well as to provide the orifices in the outermost circumference of the index plates to function similarly.

With this configuration, a careful operation of the control means responsive to the readings being generated by the sensor means can give the operator full control over the available spectrum of colors in order to create or simulate any desired color possible within the entire gamut of the given discs being used or to vary the resulting reflected color simulation as necessary.

It is an object of the present invention to provide a reflected color simulator which is continuously adjustable during rotation thereof to vary the color simulated by rotation of color discs with respect to one another.

It is an object of the present invention to provide a reflected color simulator which includes a plurality of secondary drive means which themselves are rotatable with the rotation of the color discs as a unit.

It is an object of the present invention to provide a reflected color simulator which includes a control means for individually rotating the discs with respect to one another to vary the visual effect simulated thereby.

It is an object of the present invention to provide a reflected color simulator which includes a rotational contact means for operably connecting a control means with respect to the continuously rotating individual color discs and their associated secondary drive means.

It is an object of the present invention to provide a reflected color simulator which minimizes the backlash error normally introduced by mechanical gearing.

It is an object of the present invention to provide a reflected color simulator which utilizes a plurality of concentrically configured drum means wherein each drum means is associated with a given color wheel and rotation of the drum means causes rotation of its associated color wheel.

It is an object of the present invention to provide a reflected color simulator which includes a sensor means as well as a display means for indicating the percentages of the color on each wheel being used at a given moment to create the reflected color.

It is an object of the present invention to provide a sensor means which indicates the percentage of each color component to an accuracy of one part in four hundred.

It is an object of the present invention to provide a direct mechanical connection between a drive means and its associated color disc including only one gear-to-gear meshing.

It is an object of the present invention to provide a reflected color simulator including a plurality of secondary drive means being simultaneously rotatable with rotation of the color discs and further to provide a control means for each individual secondary drive means wherein the control means remains stationary with respect to the rotating color discs. Another object is to provide a color-matching apparatus so designed as to effectively utilize a plurality of calibrated colors by means of which, and in conjunction with which, computer and related software can be useful in communicating or reproducing colors at different geographic locations, or for reproducing colors from one point in time to another, as well as color formulation.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a side sectional view of an embodiment of a reflected color simulator of the present invention;

FIG. 2 is an exploded view of an alternative embodiment of a reflected color simulator of the present invention;

FIG. 3 is an end view of an embodiment of the mounting plate of the present invention showing the secondary drive means secured thereto; and FIG. 4 is a detail, fragmentary sectional view through the disc assembly of FIG. 1.

DETAILED DESCRIPTION OF THE PREFERRED EMBODIMENT

The present invention provides a reflected color simulator which includes a plurality preferably of color discs 10 positioned adjacent to one another wherein each disc 10 includes a plurality of individual sections 12 which are interleaved with respect to one another. In this interleaved configuration a rotation of one or more of discs 10 with respect to the other discs will vary the interleaved configuration between sections 12.

The interleaved configuration is best shown in FIG. 2 and in particular FIG. 4 showing the color discs 10 positioned adjacent one another with individual sections 12 interleaved. FIG. 4 shows the discs 1 through 6 and the interrelationship of the sections 12 with respect thereto. This view best illustrates that a slight rotation of one of the color discs 10 in either direction will cause a change in the various proportions of each disc exposed to an observer and as a result will change the color simulated by reflection upon rotation of the discs 10 as a unit. Also it is possible for a disc to include more than merely a different color. A disc could introduce another parameter of visual effect such as texture, gloss, fluorescence or pearlescence.

Although six discs, each with six segments are illustrated by way of example, the number of discs and disk segments can be varied. In a working embodiment, the number of discs would likely not exceed ten in all.

Main shaft means 14 provides the basic conveyance of power to the group of discs 10 to effect rotation thereof as a unit. The main shaft means is preferably fixedly held in position by a support means 52 which may include a second support means or pillow block 54 along the main shaft means for added stability. Rotational movement of the main shaft means 14 is achieved by power from the main drive means 16. Preferably this means 16 is fixedly secured to the end of the main shaft means 14 opposite from the point of location of the color discs 10.

A plurality of drum means 18a through 18f may be concentrically positioned about the main shaft means 14 and about themselves to form a group of concentrically located tubular members extending about the main shaft means 14. At the forward ends 20 of the drum means 18a through 18f they are preferably secured with respect to the associated color disc means 10a through 10f. In other words, drum means 18a is secured at the forward end 20 thereof with respect to color discs 10a. In this manner each color disc 10 will be associated with a single given drum means 18. By this means of attachment each color disc can readily be replaced with another color disc which will thereby change the possible combination of color effects achievable. It is also possible that one of the color discs 10 may be secured with respect to the main shaft means 14 to be rotatable therewith.

The construction, thus, is such that any color disc can be individually replaced. Further, the entire group or pack of discs can be interchanged with other groups or packs.

Upon operation of the main drive means 16 the main shaft means 14 will be caused to rotate and simultaneously concentrically positioned drum means 18a through 18f will cause rotation of each of the drum means and the color discs 10 with the main shaft means 14. By such rotation, the blending of the colors exposed to the observer by the group of color discs will be effected and the desired color will be simulated.

The reflected color simulator may also include a mounting plate 24 which is adapted to be fixedly secured with respect to the main shaft means 14. Mounting plate 24 is adapted to be fixedly secured with respect to a plurality of secondary drive means 26a through 26f. Each of said secondary drive means 26 includes a gearing means 28 interconnecting the output thereof with respect to one of said drum means 18a through 18f. Preferably each secondary drive means 26a through 26f is associated with a drum means 18a through 18f and therefore with a color disc 10a through 10f. With this configuration actuation of one of the secondary drive means such as 26b as shown in FIG. 1 will cause rotation of the output shaft 36b thereof and thereby cause actuation of the associated gear means causing rotation of drum means 18b in comparison to the other drum means 18a and c through f. This will result in the slight rotation of the sections 12 of color disc 10b with respect to the other color discs which will alter the respective components of color being exposed by the combination of color wheels in a forward direction and thereby slightly change the simulated color. In this manner individual operation of each of the secondary drive means 26a through 26f will be capable of varying the percentages of components of color attributed from each individual color disc 10 and as such can vary the simulated color as desired.

Gearing means 28 also serves to lock each drum means 18 with respect to the main shaft means 14 such that when rotated the drum means will rotate similarly, assuming of course, that none of the secondary drive means is also concurrently being activated. The gearing means 28 may take a variety of conventional forms, however, one alternative is shown in FIG. 1 and another alternative is shown in FIG. 2.

In FIG. 1 each secondary drive means 26 includes a secondary output shaft 36 associated therewith. This output shaft is preferably mounted within an aperture 38 which is defined within a bearing plate 40. Preferably this bearing plate is fixedly secured with respect to the main shaft means 14 to be rotatable therewith and as such provides these apertures shafts 36 includes a secondary drive gear means 34 mounted thereon. Also each drum means 18 includes a drum gear means 42 fixedly secured to the rearward end 22 thereof such that it is in mesh with the secondary drive gear means 34 mounted on the output shaft 36. In other words, as shown in FIG. 1, each secondary drive means 26b includes an outward shaft 36b having a secondary drive gear 34b secured thereto. This secondary drive gear 34b is in engagement with a drum gear means 42b associated with drum means 18b which is further associated with color disc 10b. With this configuration actuation of the secondary drive means 26b will cause rotation of output shaft 36b resulting in rotation of secondary drive gear 34b. This action will cause movement of drum gear means 42b resulting in rotation of drum means 18b with the resulting rotation of color disc 10b with respect to the other color discs 10a and 10c through f. In this manner individual control of the relative orientation of the color discs 10 with respect to one another is completely achievable by selective actuation of the secondary drive means 26a through 26f.

In an alternative preferred configuration for the gearing means 28 a plurality of index plates 44 may be included in the overall configuration of the reflected color simulator. With this configuration each drum means 18a through 18f is fixedly secured with respect to the associated color disc 10a through 10f by way of a toothed securement means 46a through 46f. This toothed securement means is directly secured to a mating disc 70 at the central point of each color disc 10 and as such the color discs are fixedly secured to rotate with the drum means 18 when rotated with respect to the other drum means or when rotated together as a unit by rotation of the main shaft means 14. Each index plate 44 is fixedly secured to the rearward end 22 of the respective drum means 18a through 18f. As a result, the control of rotational movement of the individual index plates 44 will cause similar control of rotational movement of the color discs 10.

As shown in this FIG. 2 illustration, each secondary drive means 26 includes an output shaft 36 which has fixedly secured thereto an index gear 48. Each index plate includes a plate gear 50 fixedly secured thereto and positioned in engagement with the associated index gear 48. With this configuration actuation of a given secondary drive means 26f will cause rotation of the output shaft 36b resulting in rotation of the index gear 18b since that gear is in engagement with the plate gear 50b this actuation will cause rotation of index plate 44b resulting in further rotation of drum means 18b. Consequently color disc 10b will be moved in either a clockwise or counter-clockwise direction which will vary the proportions of the colors from each of the color wheels 10a through 10f exposed in a forward direction for creating a given color simulation. In this manner independent operation of the individual secondary drive means 26a through f can selectively cause rotation of color discs 10a through 10f with respect to one another to vary the color simulated.

In order to assure independent selective operation of each of the secondary drive means 26 associated with a given color simulation system, a rotational contact means 56 as best shown in FIG. 1 is preferably to be included. In this embodiment the rotational contact means 56 includes a slip ring cylinder 58 which is fixedly secured with respect to the main shaft means 18 to be rotatable therewith. The slip ring cylinder 58 includes a plurality of circumferential contact means 60 wherein each of the contact means is in direct electrical communication with respect to one of the secondary drive means 26. Upon rotation of the main shaft means 14 the circumferential contact means 16 will rotate therewith and electrical contact is made therewith even during rotation by a brush means 62. The brush means 62 is fixedly secured with respect to the surrounding environment such as to be not rotatable with the main shaft means 14. In this manner a fixedly positioned control means 32 may be in electrical communication with respect to the brush means 62. In this manner the control means 32 may directly control the amount of current flowing through each brush means 62 and thereby effectively control the electrical current being supplied to each secondary drive means 26. In this manner the control means 32 will achieve full operational control of the relative positions of the color discs 10 with respect to one another. This control will be maintained continuously whether or not the group of color discs 10 is rotating or not. This is a significant advancement over the prior art since such direct control has not been available heretofore simultaneously with the rotation of the color discs 10 to form the simulated color. Therefore with the present configuration the rotation of the discs 10 to cause the reflected color simulation will not prevent a change of the relative positions of the discs 10 with respect to one another. This complete and continuous control of the mixing of the color from the individual discs 10 is achieved primarily by the positioning of the individual secondary drive means 26 in a fixed orientation with respect to the main shaft means 14 to be rotatable therewith.

It is often desirable to be able to determine what proportions of each of the individual color discs 10 comprise the surface of the color disc group exposed for viewing by an observer. In order to determine this overall proportion of components a sensor means is operably secured with respect to the movement of the color discs to thereby sense and display the amount of color exposed from the sections of each of the color discs 10. This sensor means preferably a photoelectric device, may be fixedly secured with respect to the surrounding environment in a position to sense the color of the color discs. Preferably, the photoelectric sensor means will be operable to sense a plurality of orifices which may be positioned peripherally around each color disc 10. Although orifices would be the preferred means of indicating percentages of each color wheel being exposed, it is entirely possible to use other means such as reflective strips or the like. Orifices 64 may be operable in cooperation with the photoelectric means 66 to indicate what proportion of each of the components is being exposed in the forward direction for simulating color. Also a display means 68 may be included to actually give a direct readout of the color proportions. Also these orifices 64 may be positioned about the index plates in the configuration shown in FIG. 2. Since the index plates of FIG. 2 rotate simultaneously at all times with respect to the associated color wheels, it is possible to form this configuration of orifices 64 and to sense the color mixture by the sensor means 30 in either configuration. Namely, it is possible for these orifices to be positioned in the outer periphery of the index plates or in the outer periphery of the color discs and in both configurations the sensing means will operate in a similar fashion. As shown in FIG. 2 the sensor means 30 will be operable to count the number of orifices at various radial distances from the central axis of the rotating index plates 44. To facilitate operation of sensor means 30 a plurality of sensor zones 72a, b, c, d, e, and f may be included therein. To insure accuracy of sensing, the orifice centers are preferably placed 6/10 of a degree from the centers of the adjacent orifices.

Thus, by sensing the orifices and the solid spaces intervening between them, an error tolerance of only one part in four hundred can be obtained.

FIG. 2 best illustrates the operation of the orifices in combination with sensor means 30. The index plates preferably in the position of FIG. 2 illustrates the position wherein the grouping of color discs will show a fully extending color which is 100 percent of disc 10a with zero percent of discs 10b through 10f. This will result from the orifices sensed by individual sensor zones 72a, b, c, d, e, and f. As the group of index plates rotates the zone 72a will sense all of the orifices 64 associated with disc 44a and as such will render a 100 percent reading. On the other hand, discs 72b, c, d, e, and f will all sense no holes since the holes are completely blocked by the outer peripheral portion 74 of index plate 44a. On the other hand, if control means 32 is operated such that secondary drive means 26f is actuated, the index plate 44f will be caused to rotate slightly in the clockwise direction. This will result in the orifices 64 on plate 44f rotating in a downward direction as shown in FIG. 2 through a given angle. By such rotation a portion of those orifices 64 of index plate 44f will extend below the peripheral edge 76 of index plate 44a. Also the peripheral edge 78 of index plate 44f will rotate or move downwardly slightly and thereby overlap to block out a similar proportion of the uppermost orifices on index plate 44a. The reading will perhaps then read 72a sensing or counting 90 percent of the orifices of plate 44a while sensor zone 72f senses 10 percent of the orifices or plate 44f and while sensor zone 72b, c, d, and e sense a zero percentage. This operational interrelationship between the orifices can be done in a variety of ways and can also be done identically to just described whether the orifices are positioned on the outside periphery of the index plates 44 or of the color discs 10. With either configuration the operation is identical. This sensing means can be particularly useful in communicating or reproducing colors at different geographic locations or for reproducing colors from one point in time to another as well as color formulation in combination with unique software and a computer.

In operation the present invention is particularly useful for the independent rotational movement of each color disc 10a through 10f with respect to the other color discs positioned thereadjacent even while the group of color discs is being rotated for color simulation. It is this continuous control of color variation made possible by the mounting of the secondary drive means 26 in fixed relationship with respect to the main rotating shaft 14 which provides the overall continuous control. This control is further facilitated by the rotational contact means 56 which effectively provides electrical communication between the rotating secondary drive means 26 and the stationary control means 32.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed are intended to be illustrative only and not intended to limit the scope of the invention.

We claim:

1. A reflected color simulator comprising:
(a) a plurality of color discs positioned adjacent to one another and each including a plurality of individual sections interleaved with said sections of adjacent of said color discs, said color discs being mounted for rotational movement thereof as a single unit, said color discs being also mounted for rotational movement with respect to one another to vary the amount of color exposed from said sections of each of said color discs to control the reflected color simulated therefrom responsive to rotational movement thereof as a unit;

(b) a main shaft means attached with respect to said color discs and adapted to cause rotational movement thereof;

(c) a main drive means secured with respect to said main shaft means to selectively cause rotational movement thereof and of said color discs as a unit;

(d) a plurality of drum means oriented concentrically with respect to one another around said main shaft means, each of said drum means being rotatably movable selectively with respect to one another with respect to said main shaft means, each of said drum means being associated with and being secured at one end thereof each to a different one of said color discs to selectively cause rotational movement of said color discs with respect to one another responsive to rotational movement of the associated of said drum means with respect to one another;

(e) a mounting plate secured with respect to said main shaft means to be selectively rotatable therewith;

(f) a plurality of secondary drive means fixedly secured with respect to said mounting plate to be rotatable therewith, each of said secondary drive means being associated with one of said drum means and being operatively secured thereto to selectively cause rotation thereof with respect to the other of said drum means responsive to actuation of the associated one of said secondary drive means;

(g) a gearing means operatively connecting each of said secondary drive means individually with respect to the associated one of said drum means to cause rotation of the one of said color discs associated therewith with respect to the other of said color discs responsive to actuation of the associated one of said secondary drive means to vary the amount of color exposed from said sections of each of said color discs to control the reflected color simulated therefrom responsive to rotational movement of the plurality of said color discs as a unit;

(h) a sensor means operably secured with respect to movement of said color discs to sense and display the amount of color exposed from said sections of each of said color discs; and (i) a control means operably connected with respect to said secondary drive means to control actuation thereof and to continuously control the reflected color simulated from said interleaved sections of said color discs while rotating as a unit by controlling the rotational movement of said sections of said color discs with respect to one another.

2. The reflected color simulator as defined in claim 1 wherein said gearing means includes:

(a) a plurality of secondary drive gears each being fixedly secured with respect to the output of one of said secondary drive means to be caused to move responsive to actuation thereof;

(b) a plurality of drum gear means each being fixedly secured with respect to one of said drum means in a position of engagement with respect to one of said secondary drive gear means to selectively cause rotation of said drum means and its associated color disc with respect to the other of said drum means and said color discs responsive to actuation of the associated of said secondary drive means.

3. The reflected color simulator as defined in claim 2 wherein each of said drum gear means is fixedly secured to the associated one of said drum means to the end thereof opposite from the position of securement of said color discs thereto.

4. The reflected color simulator as defined in claim 1 further including a bearing plate extending about said drum means and said main shaft means and wherein the output of each of said secondary drive means includes an output shaft on which its associated secondary drive gear is mounted, said bearing plate defining a plurality of apertures adapted to receive the end of said output shaft therein to provide support therefore and for the engagement between each of said secondary drive gears and its associated drum gear means.

5. The reflected color simulator as defined in claim 1 further comprising a plurality of index plates positioned adjacent to one another and each being fixedly secured with respect to one of said drum means to be rotatable therewith and each being associated with one of said color discs.

6. The reflected color simulator as defined in claim 5 wherein said gearing means includes:

(a) a plurality of index gears each being fixedly secured with respect to the output of one of said secondary drive means and operable to move responsive to actuation of its associated secondary drive means, each of said index gears being positioned adjacent to one of said index plates; and (b) a plurality of plate gears each being fixedly secured with respect to one of said index plates in a position of engagement with respect to one of said index gears to operably connect the output of each of said secondary drive means to the associated one of said color discs through said index gears, said plate gears, said index plates and said drum means.

7. The reflected color simulator as defined in claim 1 further comprising a support means fixedly secured with respect to the surrounding environmental structure and extending around said main shaft means and said drum means to maintain a pre-designated desired orientation thereof.

8. The reflected color simulator as defined in claim 1 further comprising a rotational contact means for operably connecting said control means and each of said secondary drive means to allow continuous adjustment of the position of said sections of said color discs relative to one another during rotation of the plurality of color discs as a unit by rotation of said main shaft means by said drive means, said rotational contact means including:

(a) a slip ring cylinder fixedly secured with respect to said main shaft means to be rotatable therewith, said slip ring cylinder including a plurality of circumferential contact means each being connected in electrical contact with respect to one of said secondary drive means; and (b) a plurality of brush means in electrical communication with respect to said control means, each of said brush means being in continuous electrical communication with respect to one of said circumferential contact means to continuously provide an individual electrical communication from said control means through said brush means, said circumferential contact means, said slip ring cylinder to each of said secondary drive means.

9. The reflected color simulator as defined in claim 1 wherein each of said color discs includes a plurality of orifices therein to indicate the proportion of said sections of each of said color discs exposed for simulation of the reflected color therefrom during rotation of said color discs as a unit by rotation of said main shaft means.

10. The reflected color simulator as defined in claim 9 wherein said sensor means is operably secured with respect to movement of said color discs by being positioned adjacent to said orifices therein to sense the number of exposed orifices associated with each of said color discs to sense the proportion of each of said color discs exposed to simulate a reflected color therefrom.

11. The reflected color simulator as defined in claim 10 wherein said sensor means comprises a photoelectric means adapted to count the number of orifices exposed associated with each color disc and sense the proportion of each of said color discs included in the reflected color simulated therefrom.

12. The reflected color simulator as defined in claim 1 wherein said sensor means includes a display means for indicating the proportion of each of said color discs exposed.

13. The reflected color simulator as defined in claim 5 wherein each of said index plates includes a plurality of orifices therein to indicate the proportion of said sections of each of said color discs exposed for simulation of the reflected color therefrom during rotation of said color discs as a unit by rotation of said main shaft means.

14. The reflected color simulator as defined in claim 13 wherein said sensor means operably secured with respect to movement of said color discs by being positioned adjacent to said orifices therein to sense the number of exposed orifices associated with each of said color discs to sense the proportion of each of said color discs exposed to simulate a reflected color therefrom.

15. The reflected color simulator as defined in claim 14 wherein said sensor means comprises photoelectric means adapted to count the number of orifices exposed associated with each color disc and sense the proportion of each of said color disc included in the reflected color simulated therefrom.

16. The reflected color simulator as defined in claim 5 further including a toothed securement means in one end of each of said drum means to fixedly secure each one of said color discs with respect to one of said drum means.

17. The reflected color simulator as defined in claim 1 including seven of said color discs.

18. The reflected color simulator as defined in claim 1 wherein one of said color discs is secured fixedly with respect to said main shaft means.

19. A reflected color simulator comprising:
(a) a plurality of color discs positioned adjacent to one another and each including a plurality of individual sections interleaved with said sections of adjacent of said color discs, said color discs being mounted for rotational movement thereof as a single unit, said color discs being also mounted for rotational movement with respect to one another to vary the amount of color exposed from said sections of each of said color discs to control the reflected color simulated therefrom responsive to rotational movement thereof as a unit;
(b) a main shaft means attached with respect to said color discs and adapted to cause rotational movement thereof;
(c) a main drive means secured with respect to said main shaft means to selectively cause rotational movement thereof and of said color discs as a unit;
(d) a plurality of drum means oriented concentrically with respect to one another around said main shaft means, each of said drum means being rotatably movable selectively with respect to one another and with respect to said main shaft means, each of said drum means being associated with and being secured at one end thereof each to a different one of said color discs to selectively cause rotational movement of said color discs with respect to one another responsive to rotational movement of the associated of said drum means with respect to one another;
(e) a mounting plate secured with respect to said main shaft means to be selectively rotatable therewith;
(f) a plurality of secondary drive means fixedly secured with respect to said mounting plate to be rotatable therewith, each of said secondary drive means being associated with one of said drum means and being operatively secured thereto to selectively cause rotation thereof with respect to the other of said drum means responsive to actuation of the associated one of said secondary drive means;
(g) a gearing means operatively connecting each of said secondary drive means individually with respect to the associated one of said drum means to cause rotation of the one of said color discs associated therewith with respect to the other of said color discs responsive to actuation of the associated one of said secondary drive means to vary the amount of color exposed from said sections of each of said color discs to control the reflected color simulated therefrom responsive to rotational movement of the plurality of color discs as a unit, said gearing means further including;
 1. a plurality of secondary drive gear means each being fixedly secured with respect to the output of one of said secondary drive means to be caused to move responsive to actuation thereof;
 2. a plurality of drum gear means each being fixedly secured with respect to one of said drum means in a position of engagement with respect to one of said secondary drive gear means to selectively cause rotation of said drum means and its associated color disc with respect to the other of said drum means and said color discs responsive to actuation of the associated of said secondary drive means, each of said drum gear means being fixedly secured with respect to the associated one of said drum means to the end thereof opposite from the position of securement of said color discs thereto;

said simulator further including a bearing plate extending about said drum means and said main shaft means, said secondary drive means also including an output shaft on which its associated secondary drive gear is mounted, said bearing plate defining a plurality of apertures therein adapted to receive the end of said output shaft therein to provide support therefore and for the engagement between each of said secondary drive gears and its associated drum gear means;

(h) a photoelectric sensor means operably secured with respect to movement of said color discs to sense and display the amount of color exposed from said sections of each of said color discs, said color discs further including a plurality of orifices therein to indicate the proportion of said sections of each of said color discs exposed for simulation of the reflected color therefrom during rotation of said color discs as a unit by rotation of said main shaft means, said sensor means being further operably secured with respect to movement of said color discs by being positioned adjacent to said orifices therein to sense the number of exposed orifices associated with each of said color discs to sense the proportion of each of said color discs exposed to simulate a reflected color therefrom;

(i) a control means operably connected with respect to said secondary drive means to control actuation thereof and to continuously control the reflected color simulated from said interleaved sections of said color discs while rotating as a unit by controlling the rotational movement of said sections of said color discs with respect to one another; and (j) a rotational contact means for operably connecting said control means and each of said secondary drive means to allow continuous adjustment of the positions of said sections of said color discs relative to one another during rotation of the plurality of color discs as a unit by rotation of said main shaft means by said main drive means, said rotational contact means including:

1. a slip ring cylinder fixedly secured with respect to said main shaft means to be rotatable therewith, said slip ring cylinder including a plurality of circumferential contact means each being connected in electrical contact with respect to one of said secondary drive means; and
2. a plurality of brush means in electrical communication with respect to said control means, each of said brush means being in continuous electrical communication with respect to one of said circumferential contact means to continuously provide an individual electrical communication from said control means through said brush means, said circumferential contact means, said slip ring cylinder to each of said secondary drive means.

20. A reflected color simulator comprising:
(a) a plurality of color discs positioned adjacent to one another and each including a plurality of individual sections interleaved with said sections of adjacent of said color discs, said color discs being mounted for rotational movement thereof as a single unit, said color discs being also mounted for rotational movement with respect to one another to vary the amount of color exposed from said sections of each of said color discs to control the reflected color simulated therefrom responsive to rotational movement thereof as a unit;
(b) a main shaft means attached with respect to said color discs and adapted to cause rotational movement thereof;
(c) a main drive means secured with respect to said main shaft means to selectively cause rotational movement thereof and of said color discs as a unit;
(d) a plurality of drum means oriented concentrically with respect to one another around said main shaft means, each of said drum means being rotatably movable selectively with respect to one another and with respect to said main shaft means, each of said drum means being associated with and being secured at one end thereof each to a different one of said color discs to selectively cause rotational movement of said color discs with respect to one another responsive to rotational movement of the associated of said drum means with respect to one another, said drum means further including a toothed securement means in one end of each of said drum means to fixedly secure each one of said color discs with respect to one of said drum means;
(e) a plurality of index plates positioned adjacent to one another and being fixedly secured with respect to one of said drum means to be rotatable therewith and each being associated with one of said color discs;
(f) a mounting plate secured with respect to said main shaft means to be selectively rotatable therewith;
(g) a plurality of secondary drive means fixedly secured with respect to said mounting plate to be rotatable therewith, each of said secondary drive means being associated with one of said drum means and being operatively secured thereto to selectively cause rotation thereof with respect to the other of said drum means responsive to actuation of the associated one of said secondary drive means;
(h) a gearing means operatively connecting each of said secondary drive means individually with respect to the associated one of said drum means to cause rotation of the one of said color discs associated therewith with respect to the other of said color discs responsive to actuation of the associated one of secondary drive means to vary the amount of color exposed from said sections of each of said color discs to control the reflected color simulated therefrom responsive to rotational movement of the plurality of said color discs as a unit, said gearing means further including:
1. a plurality of index gears each being fixedly secured with respect to the output of one of said secondary drive means and operable to move responsive to actuation of its associated secondary drive means, each of said index gears being positioned adjacent to one of said index plates; and
2. a plurality of plate gears each being fixedly secured with respect to one of said index plates in a position of engagement with respect to one of said index gears to operably connect the output of each of said secondary drive means to the associated one of said color discs through said index gears, said plate gears, said index plates and said drum means;
(i) a photoelectric sensor means operably secured with respect to movement of said color discs to sense and display the amount of color exposed from said sections of each of said color discs, each of said index plates including a plurality of orifices therein to indicate the proportion of said sections of each of said color discs exposed for simulation of the reflected color therefrom during rotation of said color discs as a unit by rotation of said main shaft means, said sensor means being operably secured with respect to movement of said color discs by being positioned adjacent to said orifices therein to sense the number of exposed orifices associated with each of said color discs to sense the proportion of each of said color discs exposed to simulate a reflected color therefrom;

(j) a control means operably connected with respect to said secondary drive means to control actuation thereof and to continuously control the reflected color simulated from said interleaved sections of said color discs while rotating as a unit by controlling the rotational movement of said sections of said color discs with respect to one another; and (k) a rotational contact means for operably connecting said control means and each of said secondary drive means to allow continuous adjustment of the position of said sections of said color discs relative to one another during rotation of the plurality of color discs as a unit by rotation of said main shaft means by said drive means, said rotational contact means including:

1. a slip ring cylinder fixedly secured with respect to said main shaft means to be rotatable therewith, said slip ring cylinder including a plurality of circumferential contact means each being connected in electrical contact with respect to one of said secondary drive means; and 2. a plurality of brush means in electrical communication with respect to said control means, each of said brush means being in continuous electrical communication with respect to one of said circumferential contact means to continuously provide an individual electrical communication from said control means through said brush means, said circumferential contact means, said slip ring cylinder to each of said secondary drive means.

* * * * *